US012752409B2

(12) United States Patent
Nagao et al.

(10) Patent No.: US 12,752,409 B2
(45) Date of Patent: Oct. 6, 2026

(54) ELECTRIC DRIVING TOOL

(71) Applicant: MAKITA CORPORATION, Anjo (JP)

(72) Inventors: Masaya Nagao, Anjo (JP); Toshiro Hirayama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/982,125

(22) Filed: Dec. 16, 2024

(65) Prior Publication Data

US 2025/0236001 A1 Jul. 24, 2025

(30) Foreign Application Priority Data

Jan. 23, 2024 (JP) ................................. 2024-007968

(51) Int. Cl.
*B25C 1/06* (2006.01)
*B25F 5/02* (2006.01)

(52) U.S. Cl.
CPC ................ *B25C 1/06* (2013.01); *B25F 5/021* (2013.01)

(58) Field of Classification Search
CPC ........... B25C 1/06; B25C 1/008; B25C 1/047; B25C 1/188; B25C 1/18; B25F 5/021
See application file for complete search history.

(56) References Cited

U.S. PATENT DOCUMENTS 3,762,620 A * 10/1973 Geist ....................... B25C 1/008 227/8
4,821,937 A * 4/1989 Rafferty .................. B25C 1/188 227/8
5,261,587 A * 11/1993 Robinson .................. B25C 1/08 227/8
5,743,455 A * 4/1998 Holliday ................... B25C 1/00 227/119
7,070,079 B2 * 7/2006 Smolinski ................. B25C 7/00 227/8
7,255,256 B2 * 8/2007 McGee ................... B25C 1/041 227/119
7,565,992 B2 * 7/2009 Buetow ..................... B25C 7/00 227/123
7,870,987 B1 * 1/2011 Zhang ..................... B25C 1/008 227/107
8,308,038 B2 * 11/2012 Tanaka ...................... B25C 7/00 227/18
8,387,846 B2 * 3/2013 Francis ..................... B25C 7/00 227/156
10,307,903 B2 * 6/2019 Reed ....................... E04F 13/18
(Continued)

FOREIGN PATENT DOCUMENTS

WO 2023/097272 A1 6/2023

*Primary Examiner* — Thomas M Wittenschlaeger
*Assistant Examiner* — Katie L Gerth
(74) *Attorney, Agent, or Firm* — Oliff PLC

(57) ABSTRACT

A driving tool includes a driver configured to drive a driving member, a driver guide configured to guide a movement of the driver, a contact arm configured to slidably couple to the driver guide, and an adapter configured to be detachably attachable to the contact arm. The adapter protrudes from the contact arm in a driving direction such that when the driving member is driven by the driver into a workpiece, a head of the driving member remains protruding outwards from a surface of the workpiece.

18 Claims, 11 Drawing Sheets

(56) References Cited

U.S. PATENT DOCUMENTS 10,926,385 B2* 2/2021 Myers .................... B25C 1/008
11,897,103 B2* 2/2024 Tse .......................... B25C 1/001
2001/0008040 A1* 7/2001 Gonnet .................. B25C 1/188 29/525.01
2004/0011845 A1* 1/2004 Walter ...................... B25C 7/00 227/120
2005/0189390 A1* 9/2005 Taylor .................... B25C 1/008 227/8
2006/0196682 A1* 9/2006 McGee .................. B25C 1/041 227/119
2008/0251567 A1* 10/2008 Shkolnikov ............. B25C 1/008 227/129
2008/0290128 A1* 11/2008 Buetow ..................... B25C 7/00 227/8
2009/0072002 A1* 3/2009 Ishizawa ............... B25C 5/1665 227/120
2009/0084824 A1* 4/2009 Jiang ......................... B25C 7/00 227/110
2009/0090762 A1* 4/2009 Leimbach ................. B25C 1/06 227/136
2009/0095786 A1* 4/2009 Gosis ...................... B25C 1/188 227/119
2009/0101690 A1* 4/2009 Kubo ...................... B25C 1/188 227/112
2009/0152323 A1* 6/2009 Lin .......................... B25C 7/00 227/150
2009/0266867 A1* 10/2009 Mina ......................... B25C 7/00 227/151
2010/0327037 A1* 12/2010 Zhang .................... B25C 1/008 227/8
2013/0119107 A1* 5/2013 Cheung .................. B25C 1/188 227/139
2014/0001228 A1* 1/2014 Shadwell .................. B25C 7/00 227/151
2016/0354919 A1* 12/2016 Fiala ......................... B25C 7/00
2018/0099400 A1* 4/2018 Wong ...................... B25C 1/188
2018/0229354 A1* 8/2018 Reed ......................... B25C 7/00
2020/0246949 A1* 8/2020 Mikat-Stevens ........ B25C 1/041
2020/0406438 A1* 12/2020 Uchiyama ................. B25C 7/00
2021/0291336 A1* 9/2021 Takeno ................... B25C 1/188
2021/0299837 A1* 9/2021 Garces ...................... B25C 1/06
2022/0178147 A1* 6/2022 Schuss, Jr. ................ B25C 7/00
2022/0184786 A1* 6/2022 Tse .......................... B25C 1/001
2022/0234186 A1* 7/2022 Meyer ....................... B25C 1/06
2022/0371170 A1* 11/2022 Ou .......................... B25C 1/043
2022/0410358 A1* 12/2022 Schroeder ............... B25C 1/008
2023/0182275 A1* 6/2023 Bierdeman ............. B25C 1/047 227/130
2025/0144778 A1* 5/2025 Mendez Jaquez ........ B25C 1/04

* cited by examiner

ELECTRIC DRIVING TOOL

CROSS-REFERENCE TO RELATED APPLICATION

This application claims priority to Japanese patent application serial number 2024-007968, filed on Jan. 23, 2024, the contents of which are incorporated herein by reference in their entirety for all purposes.

TECHNICAL FIELD

The present invention generally relates to an electric driving tool for driving a driving member, such as a nail, into a workpiece by use of an electric motor.

BACKGROUND

For example, an electric driving tool in the prior art has a driver configured to drive a driving member (fastener), a driver guide which has an ejection port at a tip end of thereof and guides the driver to the ejection port, and a contact arm configured to detect that the contact arm contacts a workpiece. The driver is driven, for example, by a motor that is powered from a battery. When the contact arm is pushed by the workpiece, the driver driven by the motor drives a driving member. The driving member moves within the driver guide together with the driver and ejects from the ejection port to be driven into the workpiece. Normally, the driving member such as, for example, a nail is driven into the workpiece such that a head of the nail is flush with a surface of the workpiece or sunk under the surface of the workpiece.

For example, when assembling a form for pouring concrete, members (workpieces) composing the form are required to be temporarily fixed to each other. When a molded concrete product is obtained, the form is disassembled. In order to easily disassemble the form, the driving members are required to be driven into the workpieces such that the heads of the driving members (nails) are not recessed below the surfaces of the workpieces. The heads of the driving members thus driven into the workpieces can be easily pulled out from the workpieces to disassemble the form. For example, a dedicated electric driving tool which uses a driving member having two heads for temporarily fixing is well known. The driving member for the temporarily fixing has a first head extending in a radial direction at its tip end, and a second head extending in the radial direction at a position apart from the first head. The driving member is driven to the workpiece such that the second head contacts a surface of the workpiece. Accordingly, the driving member is driven into the workpiece such that the first head protrudes from the surface of the workpiece.

By using the dedicated driving tool, the first head of the driving member can be easily protruded from the surface of the workpiece. However, the dedicated driving members, a dedicated magazine for the dedicated driving members, and the dedicated electric driving tool for the dedicated magazine and driving members are required. Accordingly, the dedicated electric driving tools in this type do not have a usefulness because a driving member having one head, which is universally used, cannot be used in the dedicated electric driving tools.

Thus, there is a need for the electric driving tool to drive a driving member such that a head of the driving member is not recessed below a surface of the workpiece regardless of a shape of the driving tool.

SUMMARY OF THE DISCLOSURES

According to one aspect of the present disclosure, an electric driving tool comprises a driver configured to drive a driving member, a driver guide configured to guide a movement of the driver, and a contact arm configured to slidably couples to the driver guide. The electric driving tool also comprises an adapter configured to be detachably attachable to the contact arm, the adapter having a lower end. The adapter that attaches to the contact arm is configured to protrude from the contact arm in the driving direction, such that when the driving member is driven by the driver into a workpiece, a head of the driving member remains protruding outwards from a surface of the workpiece.

Because of this configuration, when the adapter attaches to the contact arm, a length from the ejection port to the surface of the workpiece becomes longer than that when the adapter does not attach to the adapter. Accordingly, when the adapter is pushed by the workpiece, a tip end of the driver guide (the ejection port) is apart from the surface of the workpiece in a direction opposite to the driving direction. In this state, the driving member ejects from the ejection port toward the workpiece. When the driving member ejects from the ejection port, the driver reaches the bottom dead center. The tip end of the driver at the bottom dead center is apart from the surface of the workpiece in the direction opposite to the driving direction. Accordingly, the driving member is not driven deeply to an extent that the head of the driving member reaches to the surface of the workpiece. In other words, the head of the driving member protrudes from the surface of the workpiece. Further, the head protrudes from the surface of the workpiece regardless of a length, a radius, and a shape of the driving member. Accordingly, during disassembling works, the protruding head and eventually the driving member can be easily pulled out from the workpiece.

DETAILED DESCRIPTION

Figure 1:
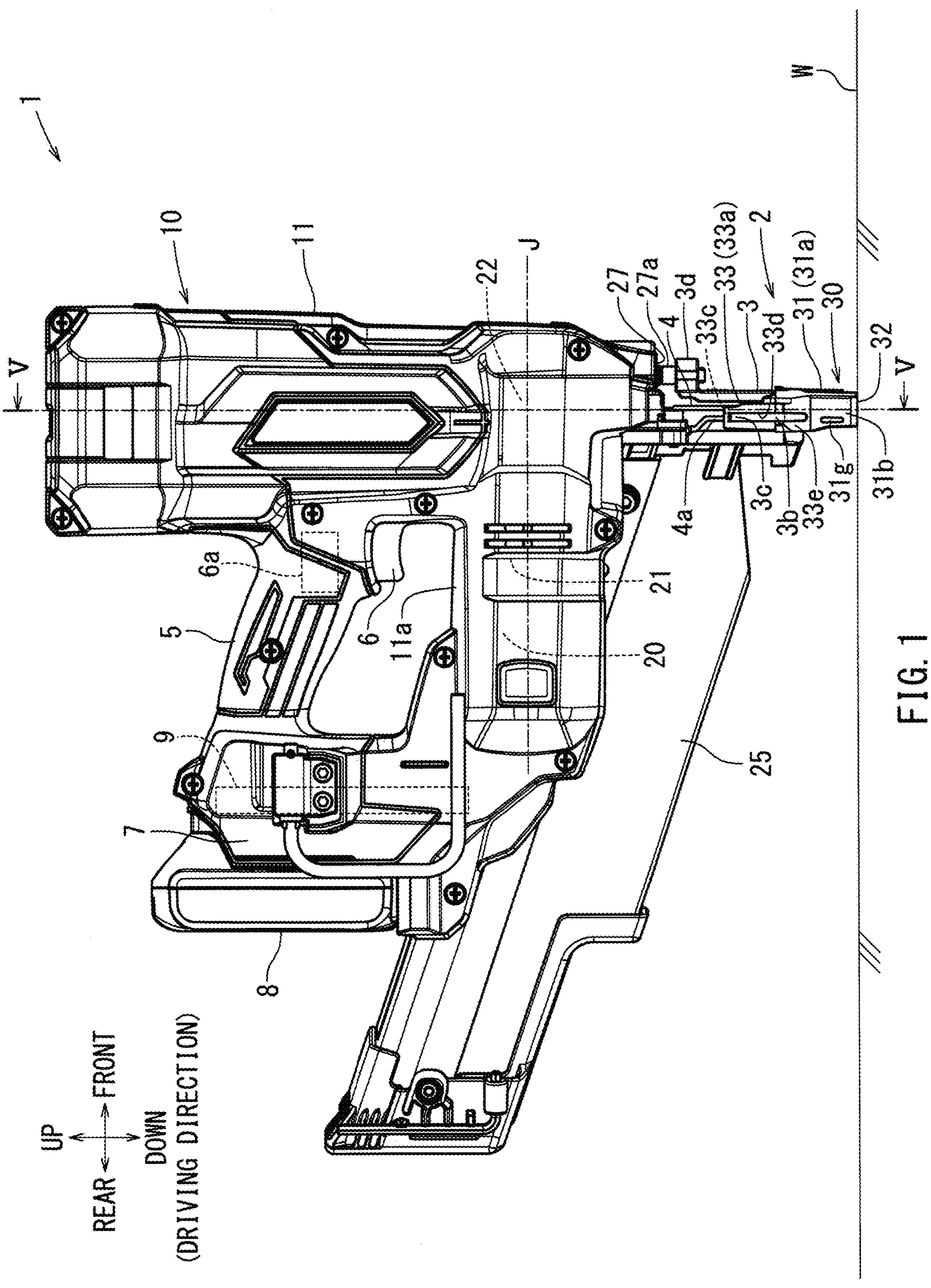
FIG. 1 is a right side view of an electric driving tool according to an exemplary embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to one aspect of the present disclosure, the lower end of the adapter that attaches to the contact arm is configured to protrude from a tip end of the contact arm by 5 mm to 10 mm in the driving direction. Accordingly, the head of the driving member protrudes from the surface of the workpiece by a length smaller than or approximately equal to the protruding length of the adapter. Thus, the driving member can be driven into the workpiece such that the head protrudes outwards from the surface of the workpiece to be easily pulled out of the workpiece.

According to another aspect of the present disclosure, the lower end has an arc shape or a U shape when viewed in the driving direction. Because of this configuration, the lower end of the adapter has high rigidity with respect to a pushing load applied by the workpiece. Furthermore, when the driving tool moves to a next driving position, the protruding head of the driving member can escape outwards of the adapter from the arc-shaped or U-shaped opening of the lower end. Accordingly, the driving tool has high operability for a user to perform a driving operation.

According to another aspect of the present disclosure, an inner circumference of the lower end of the adapter has a side that is opened and three sides when viewed in the driving direction. Because of this configuration, the lower end of the adapter has a shape with high rigidity. Accordingly, the lower end of the adapter has high rigidity with respect to a pushing load applied by the workpiece.

According to another aspect of the present disclosure, the adapter includes a main body having the lower end. Furthermore, the main body below the tip end of the contact arm in the driving direction has relatively the same sectional shape as the lower end in a direction perpendicular to the driving direction. Accordingly, the adapter has high rigidity with respect to a pushing load applied by the workpiece. Furthermore, the main body of the adapter includes a driving passage that straightly extends downward from the ejection port of the driver guide below the arm tip end of the contact arm in the driving direction. Accordingly, the driver moving in the adjoining area of the bottom dead center can be guided straight in the driving direction.

According to another aspect of the present disclosure, the adapter includes a guide piece that extends to the contact arm in a cantilevered manner and a hook that protrudes from the guide piece and is engageable with the contact arm. Accordingly, the guide piece can be easily deflected. Thus, the guide piece can be deflected for the hooks that engages the contact arm to easily detach from the contact arm.

According to another aspect of the present disclosure, the main body of the adapter has an arc-shape or a U shape when viewed in the driving direction. Further, the main body of the adapter is thicker than the guide piece in cross section perpendicular to the driving direction. Because of this configuration, the guide piece has a rigidity to such a degree as to be deflectable, and the main body has a high rigidity. Accordingly, the adapter can be easily detached from the contact arm while the rigidity of the adapter with respect to the pushing load applied to adapter is maintained.

According to another aspect of the present disclosure, the contact arm includes a rail that is slidably coupled to the driver guide, and the hook of the adapter is configured to engage an end portion of the rail of the contact arm. Accordingly, the adapter is attachable to the contact arm that has a conventional structure. Furthermore, the adapter and the contact arm are integrally movable with respect to the driver guide.

According to another aspect of the present disclosure, the electric driving tool further comprises a piston configured to connect to the driver, a cylinder configured such that the piston is movable within the cylinder, and a motor that is configured to move the driver in a direction opposite to the driving direction to increase a gas pressure in the cylinder. Accordingly, the adapter is attachable to a so-called gas spring type driving tool. When it is required to protrude a head of the driving member from the surface of the workpiece, a user can use the adapter that is attachable to the contact arm for this purpose. On the contrary, when it is required to drive the driving member normally in such a manner that the head of the driving member is flush with the surface of the workpiece, the user detaches the adapter from the contact arm. In this way, the gas spring type driving tool which has a conventional structure can be used to change a driving depth of the driving member by attachment and detachment of the adapter.

According to another aspect of the present disclosure, the driver has a rectangular shape when viewed in the driving direction, and the driver guide has a rectangular shape to surround the driver when viewed in the driving direction. Further, the three sides of the adapter follows a shape of the driver guide for the adapter to surround the driver guide when viewed in the driving direction. The driver of the gas spring type driving tool includes the engaging portions such as the rack teeth which are movable in a direction opposite to the driving direction by, for example, driving of the motor. Accordingly, the driver is formed in a rectangular shape in cross section when viewed in a direction perpendicular to the driving direction. Thus, the lower end of the adapter has three sides which surround the rectangular-shaped driver. Because of this configuration, the adapter and the driver cooperate to guide the driver straight in the driving direction.

Next, an exemplary embodiment of the present disclosure will be explained with reference to FIGS. 1 to 12. As an example of a driving tool 1, a gas-spring type driving tool is exemplified which utilizes a pressure of the gas filled in an accumulation chamber as a thrust force for driving a driving member (fastener). In the following explanation, a driving direction of the driving member is a downward direction and a direction opposite to the driving direction is an upward direction. A user of the driving tool 1 is generally situated on a rear side of the driving tool 1 in FIG. 1. Also, in FIG. 1, a nearer side of the user is referred to as a rearward direction and a direction opposite to the rearward direction is a forward direction. A leftward/rightward direction is based on the user's position.

Figure 5:
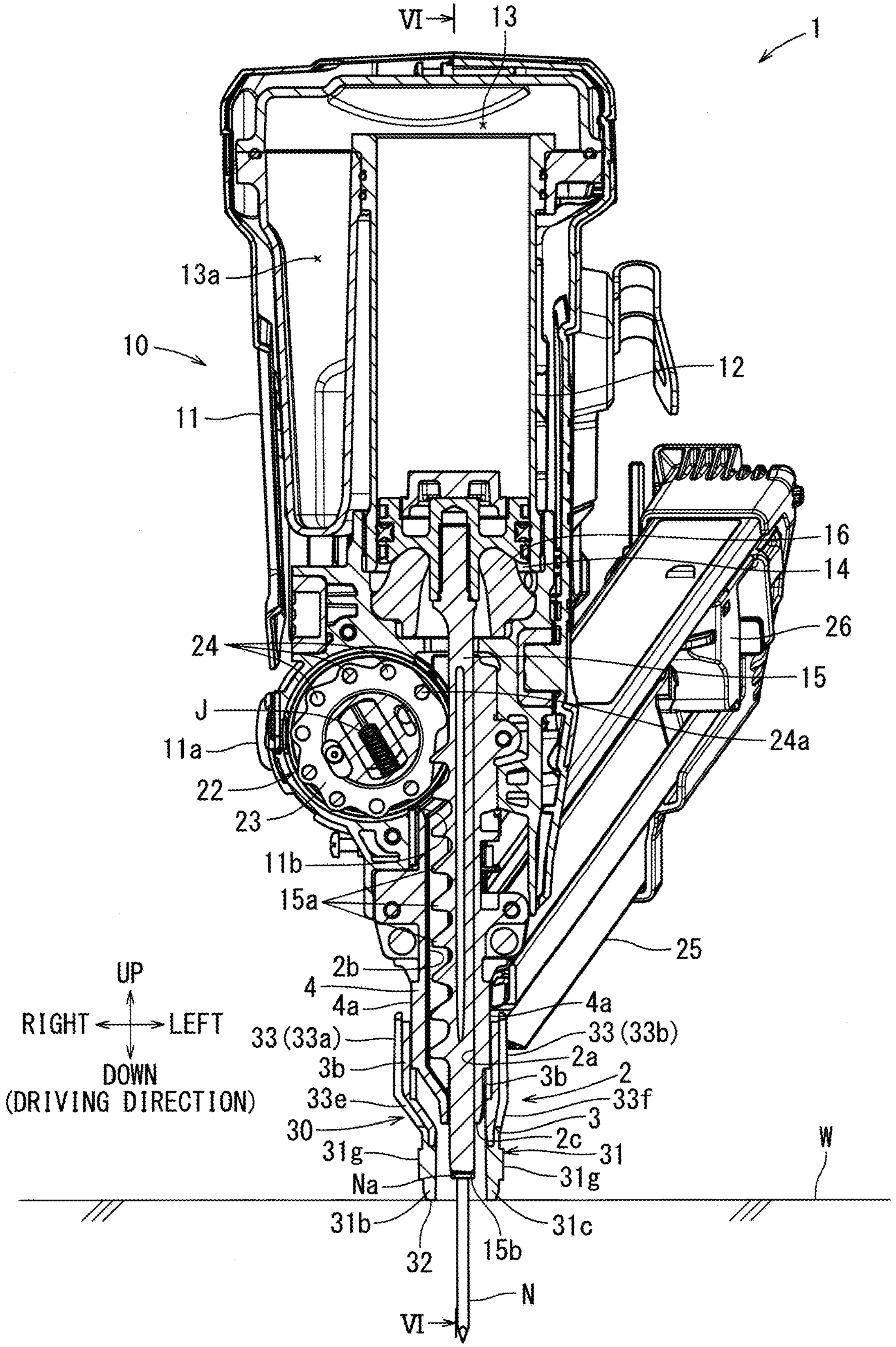
FIG. 5 is a cross-sectional view taken along line V-V of FIG. 1.

As shown in FIGS. 1 and 5, the driving tool 1 includes a tool main body 10. The tool main body 10 includes an approximately tubular-shaped main body housing 11 which houses a cylinder 12. The cylinder 12 houses a piston 14 such that the piston 14 reciprocates in an up-down direction. An upper portion of the cylinder 12, which is above the piston 14, communicates with to an accumulation chamber 13. A compression gas, for example, air, is filled in the accumulation chamber 13. A pressure of the gas filled in the accumulation chamber 13 acts as a thrust force for biasing an upper surface of the piston 14 to move in a downward direction. A right portion of the accumulation chamber 13 communicates with an air chamber 13*a* which extends downward along a right side surface of the cylinder 12. The air chamber 13*a* is arranged above a lift mechanism 22. The lift mechanism 22 is discussed later in detail. A tubular-shaped damper 16 is arranged on a lower side of the cylinder 12 to absorb an impact of the piston 14 that moves to a bottom dead center.

Figure 3:
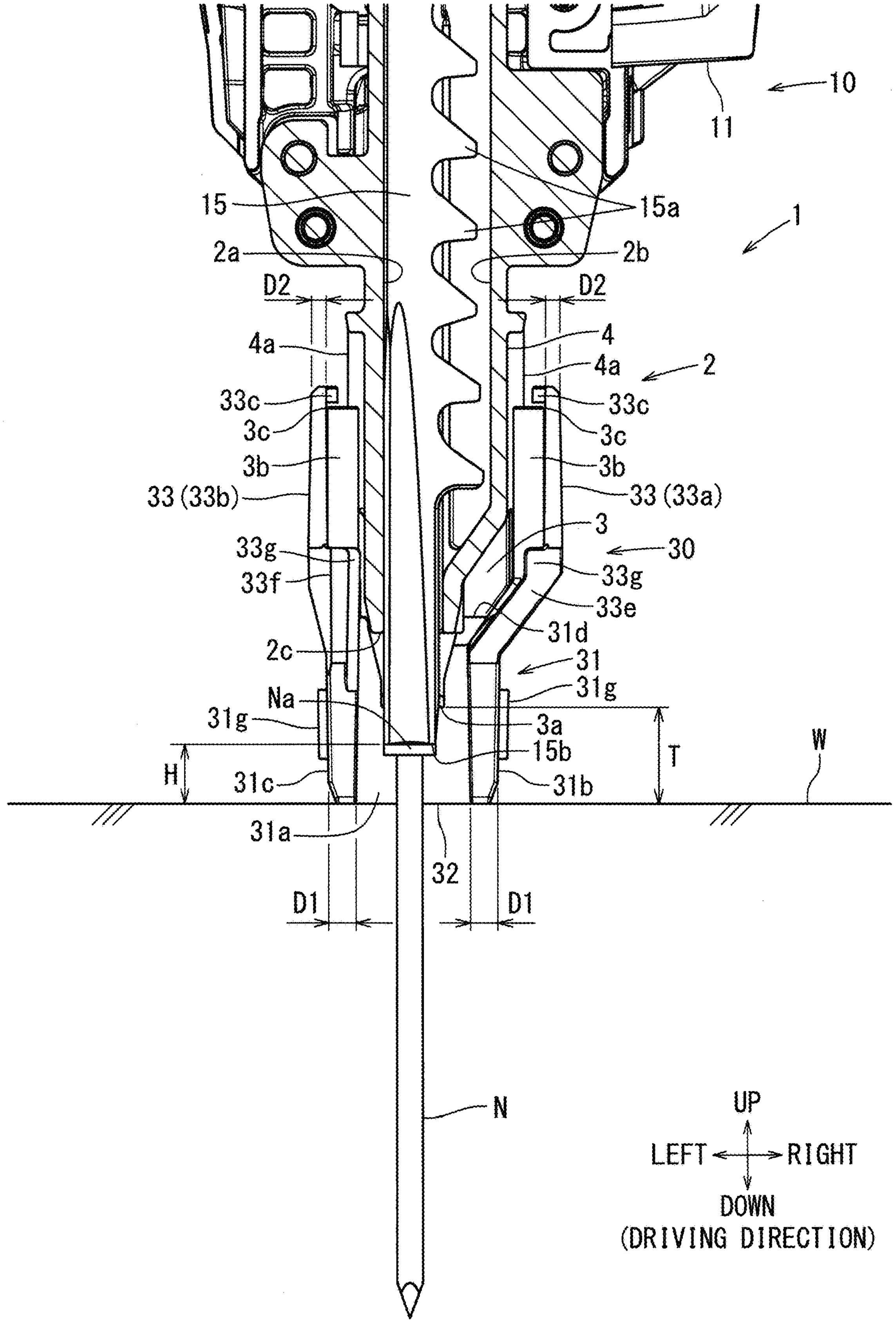
FIG. 3 is a rear view of the driving nose without a magazine.

As shown in FIGS. 3 and 5, a driving nose 2 including a driving passage 2*a* is arranged at a lower portion of the tool main body 10. The driving passage 2*a* extends in the up-down direction and connects to a lower portion of the cylinder 12 at a top end of the driving passage 2*a*. The driving nose 2 includes a driver guide 4 which forms the driving passage 2*a*. A magazine 25 is linked to a rear portion of the driver guide 4. The magazine 25 houses a plurality of driving members (fasteners) N that are arranged in parallel in a front-rear direction with each other extending in the up-down direction. The plurality of driving members N arranged in parallel in the front-rear direction are combined to each other. Each of the plurality of driving members N is supplied in a forward direction toward the driving passage 2*a* one by one such that its head Na faces in an upward direction.

Figure 2:
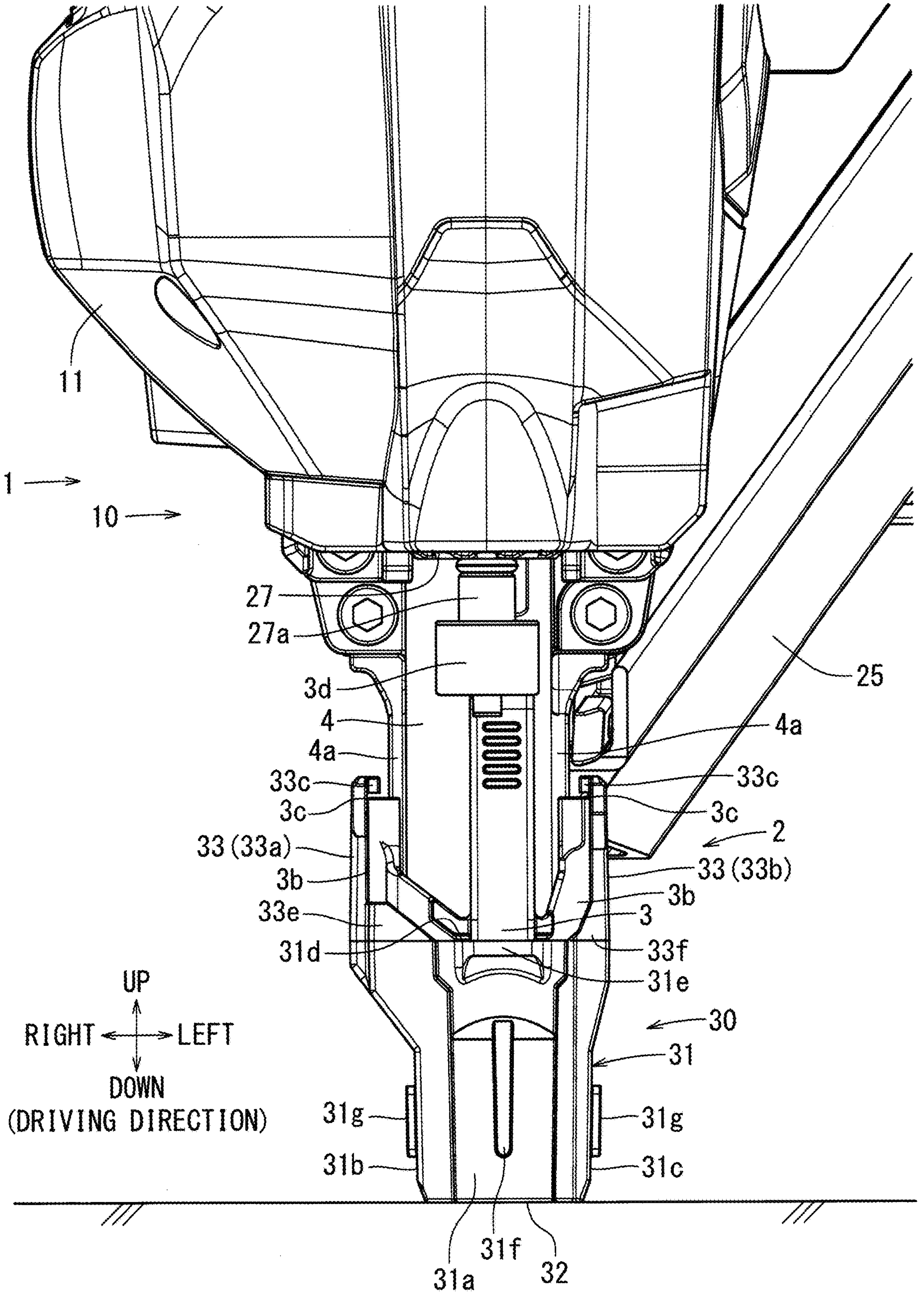
FIG. 2 is a front view of a driving nose.

As shown in FIGS. 1 and 2, the driving nose 2 includes a contact arm 3 that is slidably movable with regard to the driver guide 4. The contact arm 3 is normally biased in the downward direction to an off position. The contact arm 3 moves in the upward direction to an on position against a biasing force by directly contacting a workpiece W or by being indirectly pushed. FIGS. 1 and 2 show that the contact arm 3 and an adapter 30 move to the on position. The adapter 30 is discussed later in detail.

As shown in FIG. 1, a grip 5 for a user to hold is arranged at a rear portion of the tool main body 10 so as to extend in the front-rear direction. A trigger 6 for a user to pull by his/her fingertip is arranged at a lower surface of the front portion of the grip 5. A trigger switch 6*a* locates in the grip 5 and turns on or off via the trigger 6. When the contact arm 3 or the adapter 30 is pushed by the workpiece W to move upward to the on position, the trigger 6 is active. A battery attachment portion 7 extending in the up-down direction is arranged on a rear side of the grip 5. A battery 8 is removably attachable to the battery attachment portion 7. The battery 8 removed from the battery attachment portion 7 can be recharged by a dedicated charger for repeated use. The battery 8 can be used as a power source for other electric power tools. The battery 8 supplies power to an electric motor 20 etc.

As shown in FIG. 1, the main body housing 11 includes a tubular-shaped driving unit case 11*a* extending in the front-rear direction above the magazine 25. A rear portion of the driving unit case 11*a* connects to a lower portion of the battery attachment portion 7. The grip 5, the battery attachment portion 7, and the driving unit case 11*a* cooperate with each other to form a loop shape. A controller 9, which is housed in a shallow rectangular box-shaped case, is arranged in front of the battery attachment portion 7. The controller 9 is arranged in the main body housing 11 such that a longitudinal direction is approximately the up-down direction and a width direction is the front-rear direction. The controller 9 mainly controls the electric motor 20.

As shown in FIG. 5, the driving tool 1 includes a driver 15 configured to drive a driving member N. The driving member N is, for example, a nail which is universally used and includes only one head Na extending in a radial direction. The driver 15 extends in the up-down direction and connects to a lower surface of the piston 14 at a top end of the driver 15. A lower portion of the driver 15 enters the driving passage 2*a*. The driver 15 moves downward by an active gas pressure of the accumulation chamber 13 applied to the upper surface of the piston 14. A tip end 15*b* of the lower end of the driver 15 moves downward to drive a head Na of the driving member N (a fastener head Na of the fastener N) loaded to the driving passage 2*a*. The driving member N driven by the driver 15 ejects from an ejection port 2*c* that is open at a lower end of the driving passage 2*a*. The driving member N ejecting from the ejection port 2*c* is driven into the workpiece W.

As shown in FIG. 5, a plurality of rack teeth (engaged portions) 15*a* extending rightward are arranged on a right side of the driver 15. In the exemplary embodiment, nine rack teeth 15*a* are arranged in the up-down direction. Each of the rack teeth 15*a* has a triangular shape including a bottom portion facing in a driving direction (downward direction). The bottom portion of each of the rack teeth 15*a* engages a corresponding engaging portion 24 of the lift mechanism 22.

As shown in FIG. 1, the driving unit case 11*a* houses the electric motor 20 serving as a driving source. The motor 20 is housed such that a motor axis line J of the motor 20 extends in the front-rear direction. The motor 20, which is powered from the battery 3, is activated via the trigger 6 and the contact arm 3 including the adapter 30. A planetary gear reduction mechanism 21 is arranged in front of the motor 20. The planetary gear reduction mechanism 21 includes a three-staged planetary gear train. The lift mechanism 22 configured to move the driver 15 upward is arranged in front of the planetary gear reduction mechanism 21. The motor 20, the planetary gear reduction mechanism 21, and the lift mechanism 22 are arranged in parallel along the motor axis line J. A rotation power of the motor 20 is reduced by the planetary gear reduction mechanism 21 and transmitted to the lift mechanism 22.

As shown in FIG. 5, the lift mechanism 22 is arranged on a right side of the driving nose 2. The lift mechanism 22 includes a wheel 23 rotatable around the motor axis line J. The wheel 23 is rotatable counterclockwise and is restricted from rotating clockwise when viewed from the front. A plurality of engaging portions 24 are arranged along an outer circumferential edge of the wheel 23. In the exemplary embodiment, for example, nine engaging portions 24 are arranged at equal intervals in a circumferential direction of the wheel 23. For example, a cylindrical-shaped shaft member (pin) extending in the front-rear direction is used for each of the engaging portions 24. When the wheel 23 rotates, each of the engaging portions 24 moves (rotates) around the wheel 23, i.e., around the motor axis line J.

As shown in FIG. 5, an upper portion of the driving passage 2*a* is wider than a lower portion thereof in the left-right direction, which is referred to as a wider portion 2*b*. Because of the wider portion 2*b*, the rack teeth 15*a* are movable in the up-down direction without being interfered with the driving passage 2*a*. A left portion of the wheel 23 enters the driving passage 2*a* via a window 11*b* that is arranged on a right side of the wider portion 2*b*. Each of the plurality of engaging portions 24 of the wheel 23 engages a bottom portion of the corresponding rack tooth 15*a* of the driver 15 within the driving passage 2*a*. The wheel 23 rotates counterclockwise with at least one of the plurality of engaging portions 24 engaging the bottom portion of the corresponding rack tooth 15*a*. Because of this, the driver 15 together with the piston 14 moves upward to increase the pressure of the gas in the accumulation chamber 13.

As shown in FIGS. 1 and 5, the magazine 25 has an approximately rectangular box shape extending from the driving nose 2 approximately in a rearward direction. The magazine 25 tilts leftward with respect to the tool main body 10 as the magazine 25 extends rearward. The magazine 25 houses a plurality of driving members N. A front end of the magazine 25 is open to and connects to the driving passage 2*a*. The magazine 25 includes a pusher 26 configured to push (load) the driving members N toward the driving passage 2*a*.

Figure 7:
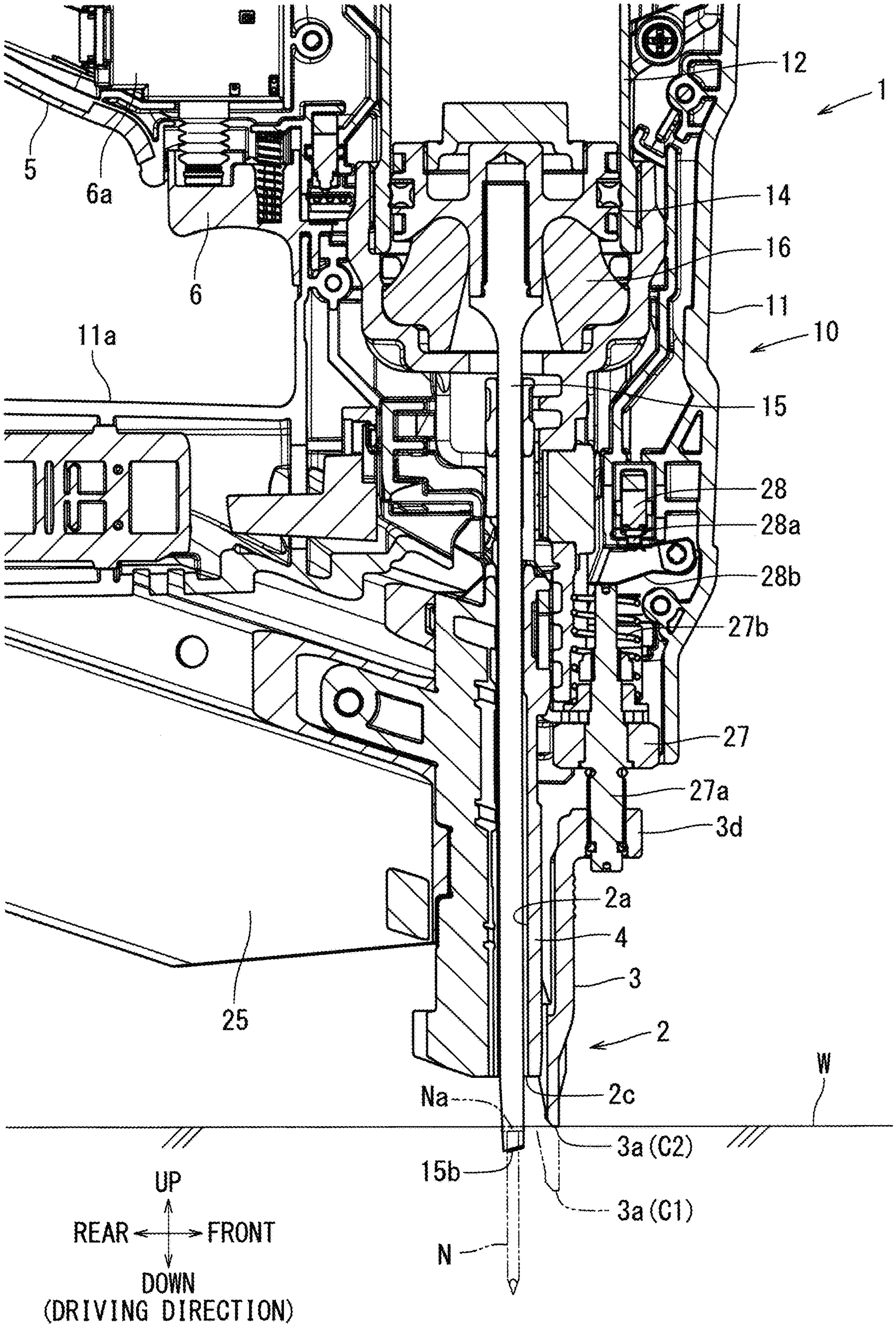
FIG. 7 is a cross-sectional view similar to FIG. 6, showing a lower portion of the electric driving tool without an adapter.
Figure 8:
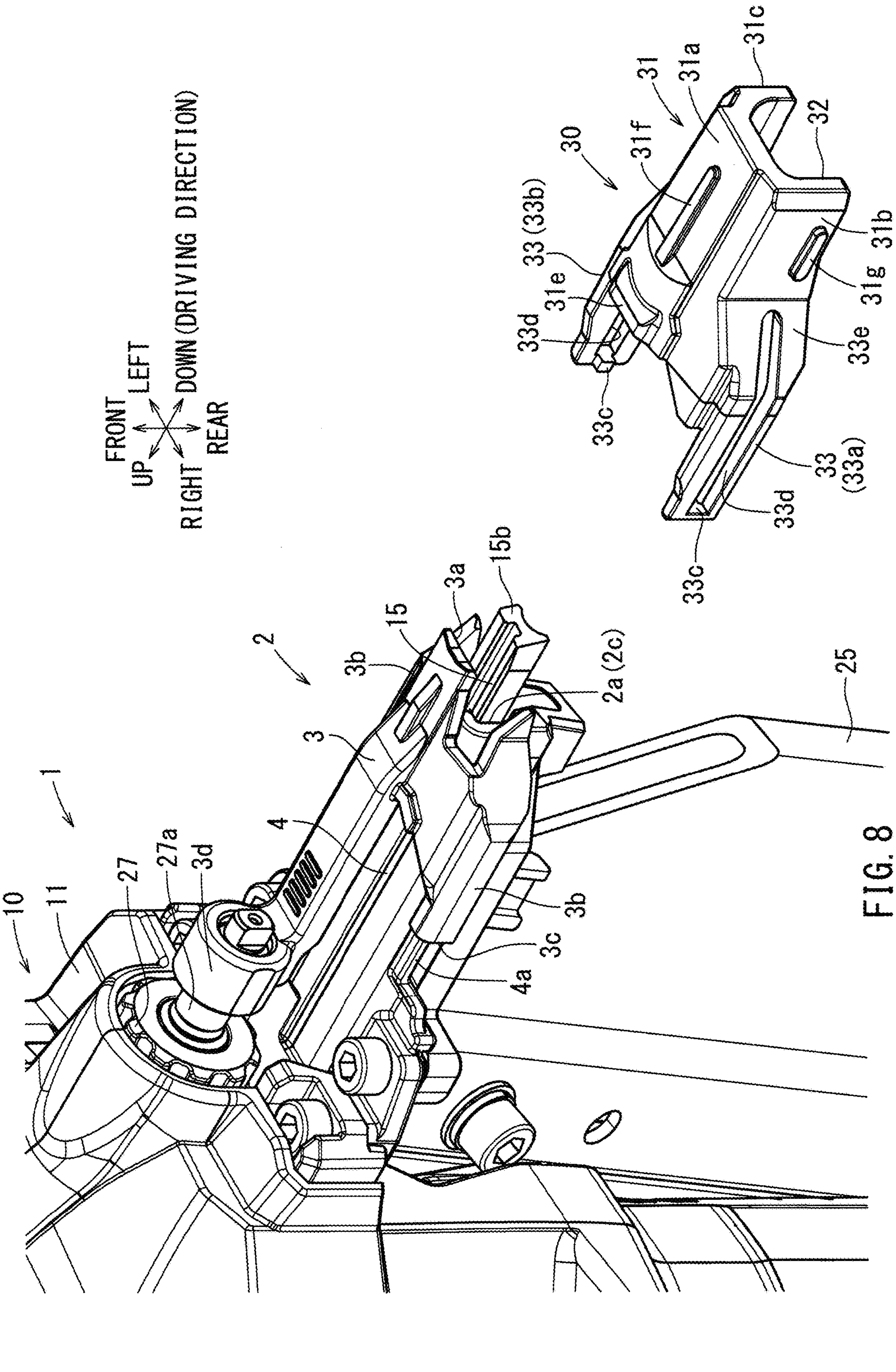
FIG. 8 is an exploded perspective view of the driving nose and the adapter.

As shown in FIGS. 3, 7, and 8, the contact arm 3 protrudes downward below the ejection port 2*c*. An arm tip end 3*a* of the contact arm 3, which is a lower end of the contact arm 3, contacts a workpiece W when the adapter 30 is not attached to the contact arm 3. The driver guide 4 includes a pair of rail engagement portions 4*a* extending straight in the up-down direction on the outer surface of the driver guide 4. The contact arm 3 includes a pair of rails 3*b* such that one of the pair of rails 3*b* is arranged on the left side of the contact arm 3 and the other is on the right side thereof so as to slidably engage the pair of rail engagement portions 4*a*, respectively. Each of the rails 3*b* has an arc shaped or a U shaped cross section when viewed from above (or below). Instead, an inner circumference of each of the rails 3*b* may have one open side and three closed sides, which are a front side, a rear side, and a left or right side when viewed from above (or below). The pair of rails 3*b* of the contact arm 3 hold the pair of rail engagement portions 4*a* from both left and right sides such that the part of rails 3*b* are supported by the driver guide 4 so as to be slidable in the up-down direction. Each of the pair of rails 3*b* includes an end portion 3*c* at an upper portion thereof extending in the left-right direction and in the front-rear direction.

As shown in FIGS. 7 and 8, an adjuster 27 is arranged on an upper and front side of the driving nose 2. The adjuster 27 has a cylindrical shape and is turnable around a rotation shaft 27*a* that extends in the up-down direction. The adjuster 27 is turnable integrally with the rotation shaft 27*a*. An adjuster connection portion 3*d* that connects to the rotation shaft 27*a* is arranged at the front and upper portion of the contact arm 3. The contact arm 3 and the adjuster 27 are integrally movable in the up-down direction. The adjuster 27 is biased downward by a compression spring 27*b* that is housed in the main body housing 11. Accordingly, the contact arm 3 is biased downward by the compression spring 27*b*. When the adjuster 27 rotates around the rotation shaft 27*a*, the adjuster connection portion 3*d* moves with respect to the rotation shaft 27*a* in the up-down direction. Because of this configuration, a protruding length of the contact arm 3 can be adjusted in the up-down direction with respect to the ejection port 2*c*.

As shown in FIG. 7, a switch 28 is arranged in the main body housing 11 above the adjuster 27. The switch 28 includes a protruding pin 28*a* on a lower surface of the switch 28, which is pushable in the upward direction. When the protruding pin 28*a* is pushed, the switch 28 transmits an on-signal to the controller 9. A U-shaped spring 28*b* viewed from the right-left direction is arranged between an upper end of the rotation shaft 27*a* and the protruding pin 28*a* in the up-down direction. A lower end of the spring 28*b* contacts the upper end of the rotation shaft 27*a*. An upper end of the spring 28*b* contacts the lower end of the protruding pin 28*a*. When the contact arm 3 is positioned at the off position C1 in the downward direction, the rotation shaft 27*a* is at a lower position. Accordingly, the switch 28 is not turned on because the protruding pin 28*a* is not pushed by the rotation shaft 27*a* via the spring 28*b*. When the contact arm 3 is pushed by the workpiece W to move to an on position C2 in the upward direction, the rotation shaft 27*a* moves upward. Accordingly, the protruding pin 28*a* is pushed by the rotation shaft 27*a* via the spring 28*b*, which causes the switch 28 to transmit an on signal to the controller 9.

Figure 6:
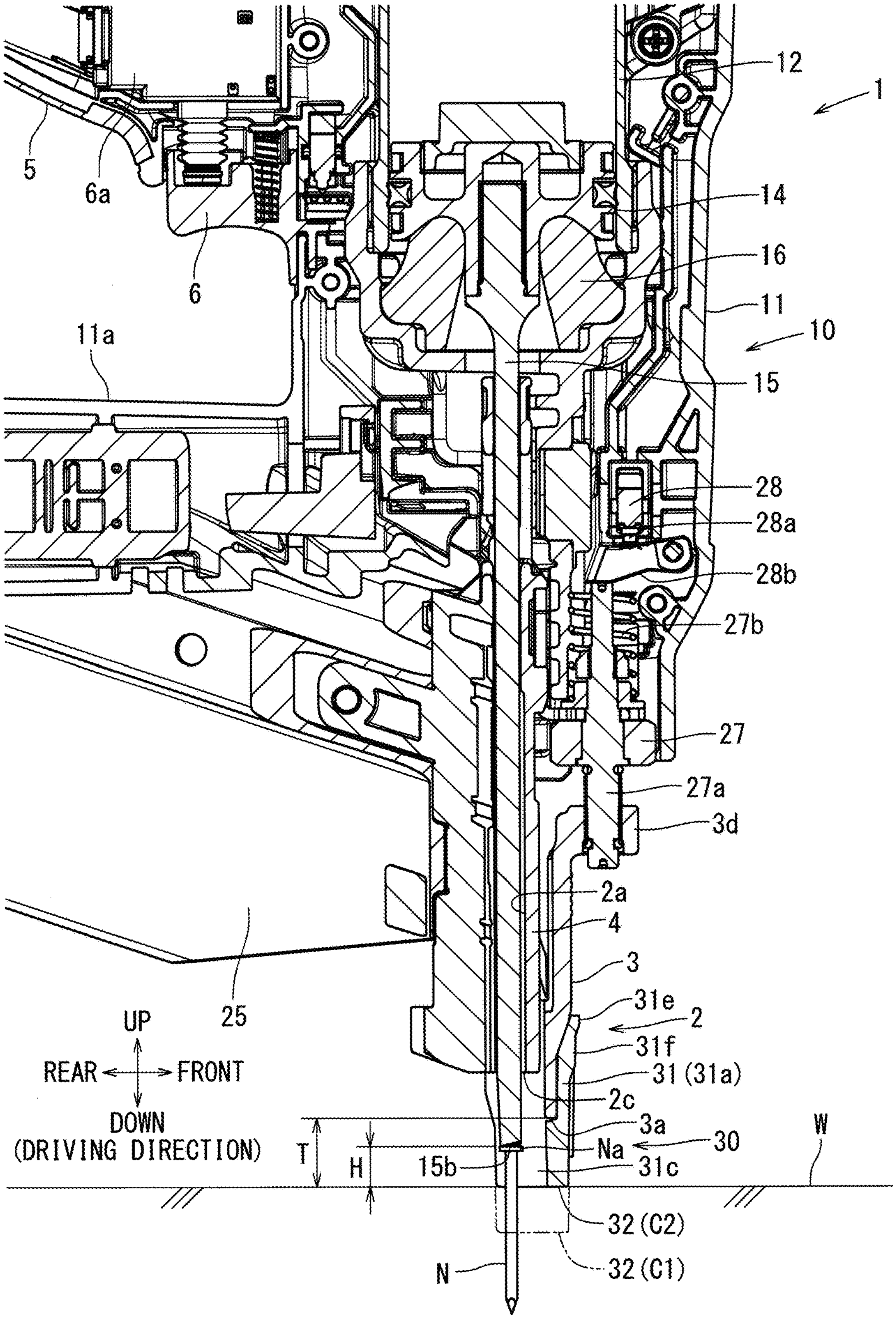
FIG. 6 is a cross-sectional view taken along line VI-VI of FIG. 5, showing a lower portion of the electric driving tool.

As shown in FIGS. 1, 6, and 8, an adapter 30 is attachable to a lower portion of the contact arm 3. The adapter 30 is made of a rigid resin having high rigidity and wea-resistance such as, for example, POM (polyacetal or polyoxymethylene). The adapter 30 includes a main body 31 and a pair of guide pieces 33. The main body 31 includes a lower end 32 at a lower portion of the main body 31. The pair of guide pieces 33 are formed so as to be positioned on a left side and a right side of the main body 31. The lower end 32 of the adapter 30, when attached to the contact arm 3, protrudes downward from the arm tip end 3*a* of the contact arm 3 in the downward direction by a protruding length T. Referring to FIG. 6, the protruding length T is, for example, 5 mm to 20 mm. Preferably, the protruding length T is 10 mm to 15 mm.

As shown in FIGS. 1, 6, and 8, the adapter 30 includes a planar front wall 31*a* extending in the right-left direction and in the up-down direction on a front side of the adapter 30. The adapter 30 includes a planar right wall 31*b* extending in the front-rear direction and in the up-down direction on the right side of the adapter 30. The right wall 31*b* is connected to a right end of the front wall 31*a* so as to be approximately perpendicular to each other. The adapter 30 includes a planar left wall 31*c* extending in the front-rear direction and in the up-down direction on the left side of the adapter 30. The left wall 31*c* is connected to a left end of the front wall 31*a* so as to be approximately perpendicular to each other.

Figure 4:
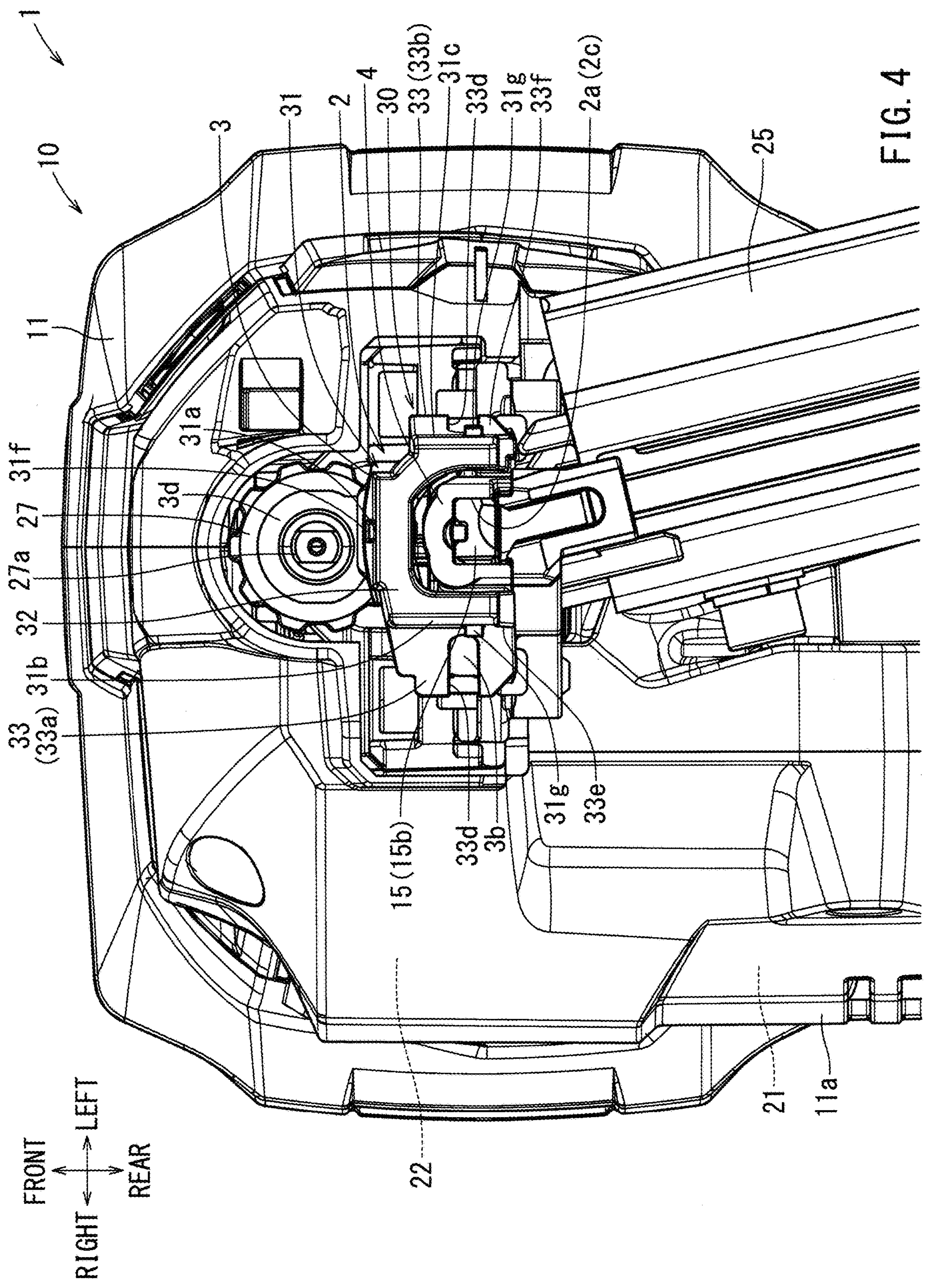
FIG. 4 is a bottom view of the driving nose.
Figure 12:
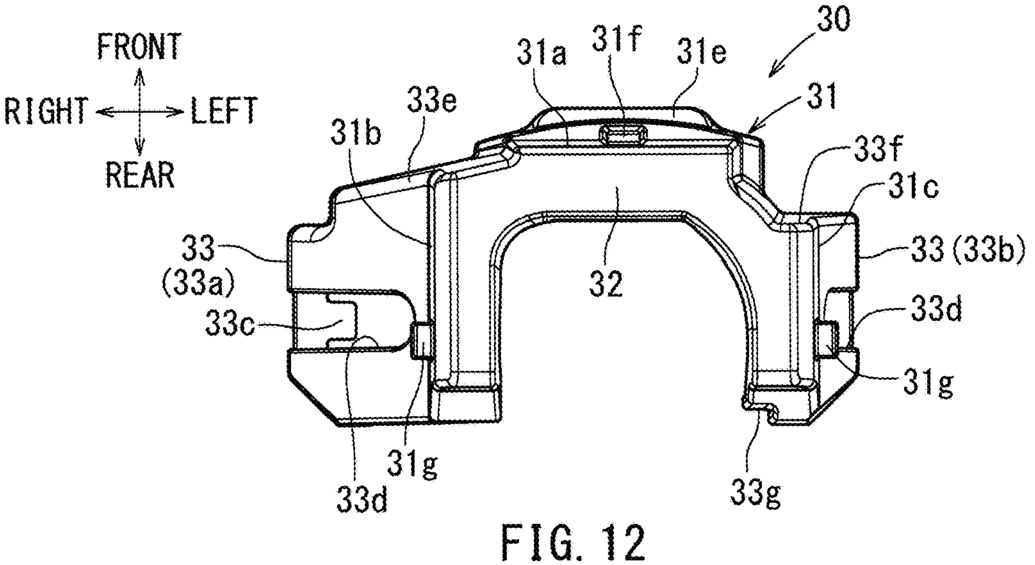
FIG. 12 is a bottom view of the adapter.

As shown in FIGS. 4, 8, and 12, the lower end 32 of the adapter 30 has an arc shape or a U shape viewed from below and is opened in a rearward direction. In other words, when viewed from below, the lower end 32 of the adapter 30 is opened rearward and has a front side, a right side, and a left side. Referring to FIG. 5, the main body 31 of the adapter 30 below the arm tip end 3*a* of the contact arm 3 in the driving direction (in the downward direction) has an approximately the same sectional shape as that of the lower end 32 in a direction perpendicular to the driving direction. When viewed from below, the lower end 32 of the adapter 30 follows a shape of the driver guide 4 that surrounds the driver 15.

Figure 11:
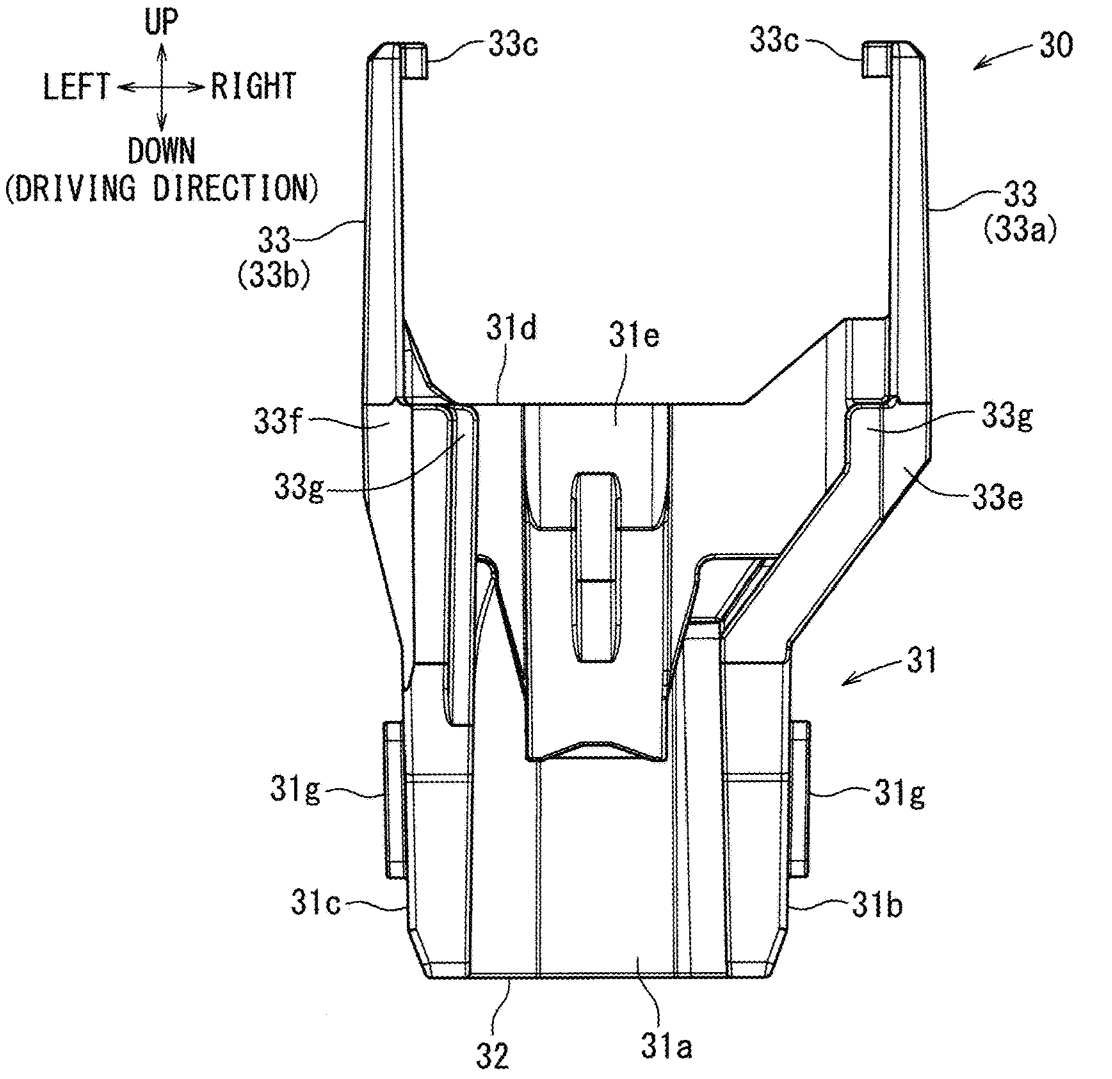
FIG. 11 is a rear view of the adapter.

As shown in FIGS. 1, 8, and 11, the front wall 31*a* includes a rib-shaped indicator 31*f* that protrudes frontward and extends in the up-down direction. The indicator 31*f* is at a center of the driver 15 in the right-left direction viewed from below. In other words, the indicator 31*f* shows a position of the driving member N in the right-left direction that ejects from the ejection port 2*c*. The right wall 31*b* includes a rib-shaped indicator 31*g* protruding rightward and extending in the up-down direction. Similarly, the left wall 31*c* includes another rib-shaped indicator 31*g* protruding leftward and extending in the up-down direction. The indicator 31*g* is at a center of the driver 15 in the front-rear direction viewed from below. In other words, the indicator 31*g* shows a position of the driving member N in the front-rear direction that ejects from the ejection port 2*c*. An upper end 31*d* of the main body 31, which is an upper end of the front wall 31*a*, includes an arm engagement portion

31*e* that is engageable with the contact arm 3. The arm tip end 3*a* of the contact arm 3 enters the arm engagement portion 31*e* to engage the contact arm 3.

Figure 9:
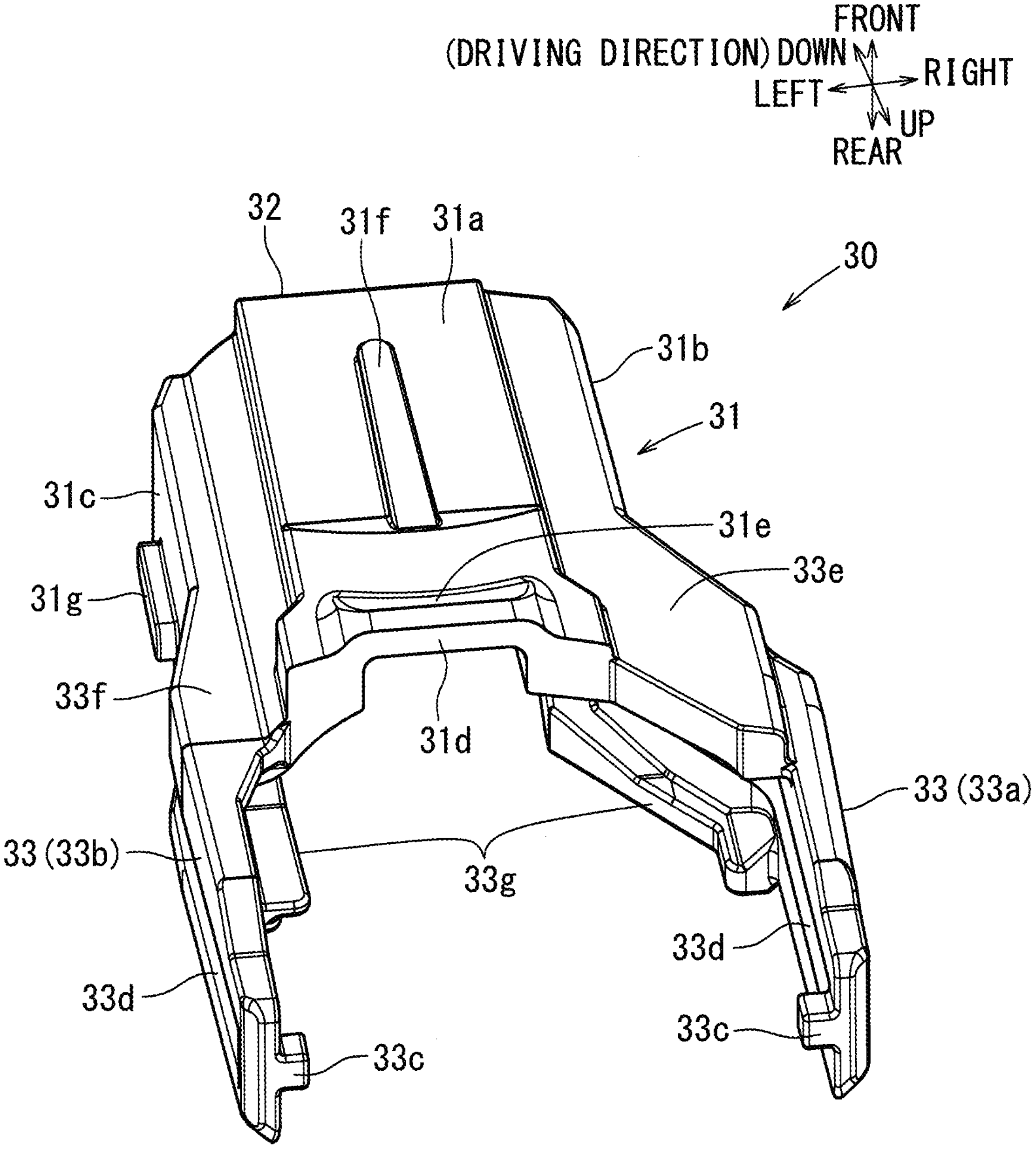
FIG. 9 is a perspective view of the adapter viewing from the front and above.

As shown in FIGS. 8, 9, and 11, the pair of guide pieces 33 includes a right guide piece 33*a* on the right side and a left guide piece 33*b* on the left side. The right guide piece 33*a* and the left guide piece 33*b* face each other and extend upward from the main body 31 approximately parallel to each other. The right guide piece 33*a* extends upward in a cantilevered manner from a base portion 33*e* that is connected to an upper right wall 31*b* of the main body 31. Similarly, the left guide piece 33*b* extends upward in a cantilevered manner from a base portion 33*f* that is connected to an upper left wall 31*c* of the main body 31. The plurality of rack teeth 15*a* are arranged on the right side of the driver 15. Accordingly, the driver guide 4 is formed asymmetrically in the right-left direction. Because of this configuration, the base portion 33*e* and the base portion 33*f* are formed asymmetrically in the right-left direction according to the shape of the driver guide 4.

Figure 10:
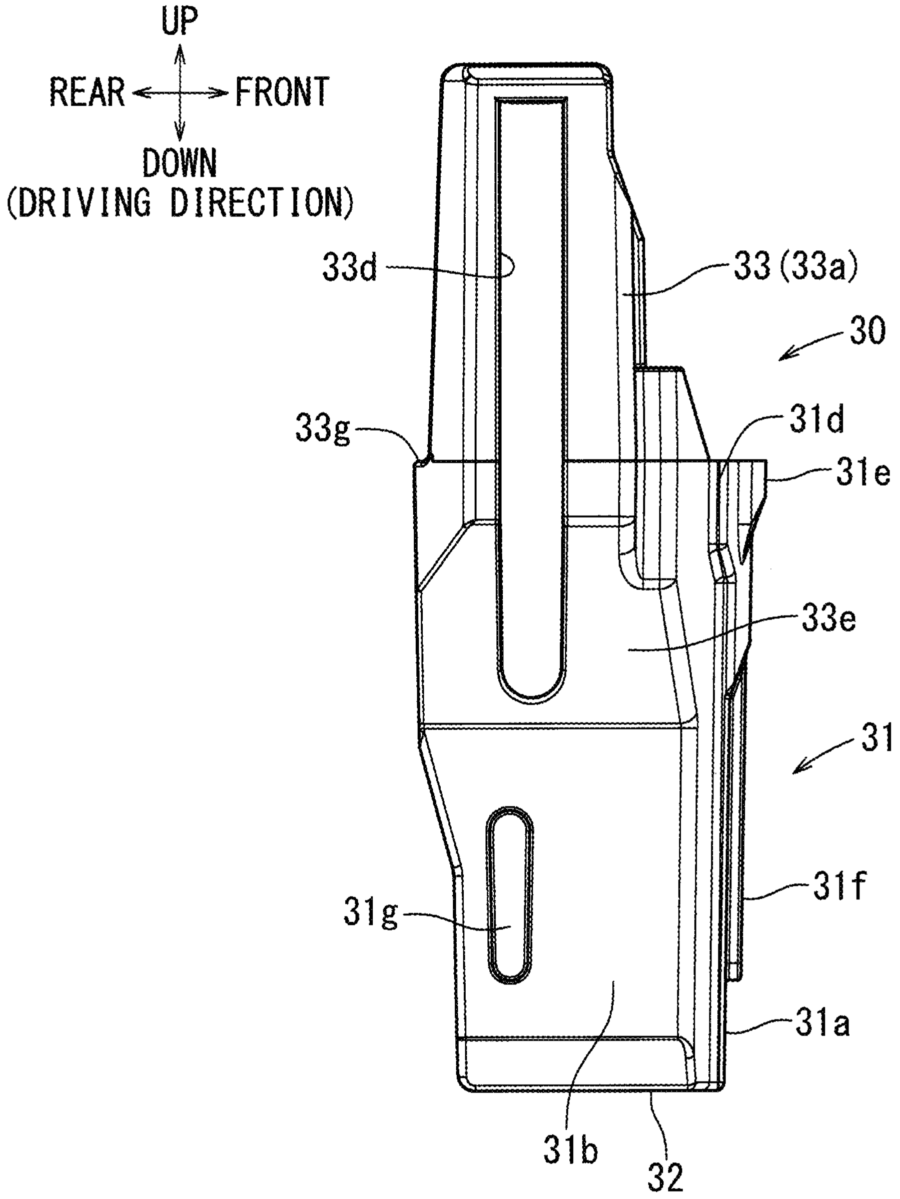
FIG. 10 is a right side view of the adapter.

As shown in FIGS. 8 to 10, the pair of guide pieces 33 each has an elongated hole 33*d* extends in the up-down direction. Each elongated hole 33*d* is formed at a center of the guide piece 33 in the front-rear direction. The elongated hole 33*d* extends longitudinally from an adjoining area of the base portion 33*e* (and the base portion 33*f*) to an adjoining area of the upper end of the guide piece 33. A hook 33*c* protruding in the right-left direction is formed at an upper end of each guide piece 33. Each hook 33*c* has a rectangular shape viewed in the up-down direction with its upper end being planar. The hook 33*c* of the right guide piece 33*a* protrudes leftward. The hook 33*c* of the left guide piece 33*b* protrudes rightward. The hook 33*c* of the right guide piece 33*a* and the hook 33*c* of the left guide piece 33*b* face with each other in the right-left direction. The pair of hooks 33*c* engage the end portions 3*c* of the pair of rails 3*b* of the contact arm 3 (refer to FIG. 3). Accordingly, the adapter 30 is attachable to the contact arm 3. The adapter 30 moves integrally with the contact arm 3 in the up-down direction between an off position and an on position.

As shown in FIG. 3, the right guide piece 33*a* and the left guide piece 33*b* have a thickness of D2 in the right-left direction. The lower end 32 of the main body 31 has a thickness of D1 in the right-left direction. The thickness D2 is smaller than the thickness D1. Because of this configuration, the right guide piece 33*a* and the left guide piece 33*b* both formed in the cantilevered manner is more resilient than (can be deflected more easily than) the main body 31 in the right-left direction. Accordingly, the hooks 33*c* can be easily removed from the end portions 3*c* of the pair of the rails 3*b* of the contact arm 3.

As shown in FIGS. 9 and 11, a rear rib 33*g* extending in the right-left direction is formed at a rear portion of each of the base portion 33*e* and the base portion 33*f*. The contact arm 3 is insertable between the front wall 31*g* and the rear ribs 33*g* in the front-rear direction. Accordingly, the adapter 30 can be positioned with respect to the contact arm 3 in the front-rear direction.

When the adapter 30 does not attach to the contact arm 3 as shown in FIG. 7, the arm tip end 3*a* of the contact arm 3 is pushed by the workpiece W to move upward to the on position C2, which causes the trigger 6 to be active. In this state, when the trigger 6 is pulled, a driving operation is performed and the driving member N ejects from the ejection port 2*c*. FIG. 7 shows that the tip end 15*b* of the driver 15 enters within the workpiece W, but in a normal operation, the driver 15 stops moving downward when the tip end 15*b* contacts the workpiece W. Accordingly, the driver 15 does not move to a bottom dead center, which is a lowermost end in an area where the driver 15 is movable. The driving member N is driven deeply to the workpiece W such that the head Na of the driving member N is flush with the surface of the workpiece W.

When the adapter 30 attaches to the contact arm 3 as shown in FIG. 6, the lower end of the adapter 30 is pushed by the workpiece W to move upward to the on position C2. In this state, when the trigger 6 is pulled, a driving operation is performed and the driving member N ejects from the ejection port 2*c*. When the damper 16 most deforms for the driver 15 to move to the bottom dead center, the tip end 15*b* of the driver 15 is positioned below the ejection port 2*c* and above the lower end 32 of the adapter 30. Accordingly, the tip end 15*b* of the driver 15 does not reach the surface of the workpiece W. The driving member N is driven by the driver 15 deeply to the workpiece W such that the head Na of the driving member N protrudes from the surface of the workpiece W by a protruding length H. The protruding length H of the head Na is smaller than or approximately equal to the protruding length T, which is a distance from the arm tip end 3*a* of the contact arm 3 to the lower end 32 of the adapter 30. The protruding length H of the head Na is, for example, 10 mm to 15 mm. The protruding length of the head Na is substantially constant regardless of a length, a radius, or a shape of the driving member N.

Next, referring to FIGS. 1, 5, and 6, a series of a driving operation of the driving tool 1 will be explained. These figures show that the driver 15 moves to the bottom dead center when a driving operation of the driving tool 1 is performed. Before a driving operation of the driving tool is performed, the driver 15 is positioned at a standby position slightly below a top dead center. In this state, a bottom surface of the rack tooth 15*a* at the lowermost end engages a corresponding engaging portion 24 of the lift mechanism 22. When the lower end 32 of the adapter 30 is pushed by the workpiece W, the adjuster 27 and the contact arm 3 attached to the adapter 30 move from the off position C1 to the on position C2. The rotation shaft 27*a* of the adjuster 27 pushes the switch 28 via the spring 28*b*. The switch 28 transmits an on signal to the controller 9. The controller 9 receives the on signal from the switch 28. In this state, when the trigger 6 is pulled by a user, the motor 20 is activated.

When the motor 20 is activated, the wheel 23 of the lift mechanism 22 rotates. The rack tooth 15*a* at the lowermost end is pushed and moved upward by the corresponding engaging portion 24 which rotates integrally with the wheel 23. Accordingly, the driver 15 moves from the standby position to the top dead center. Immediately before the driver 15 reaches the top dead center, the engaging portion 24 disengages from the lowermost rack tooth 15*a*. Then, the driver 15 moves downward owing to the active pressure of the gas filled in the accumulation chamber 13, which is applied to the piston 14. When the driver 15 moves from the standby position to the top dead center, a driving member N at the front end is loaded from the magazine 25 to the driving passage 2*a*. The tip end 15*b* of the driver 15 moves downward in the driving passage 2*a* to drive the head Na of the driving member N. While the driver 15 moves downward, all of the plurality of engaging portions 24 move (retreat) on a right side of the wider portion 2*b* of the driving passage 2*a* in the up-down direction. Accordingly, the rack teeth 15*a* of the driver 15 are prevented from interfering with the engaging portions 24 of the wheel 23, thereby performing a smooth driving operation.

When the adapter 30 attaches to the contact arm 3, the tip end 15*b* of the driver 15 stops at the bottom dead center and above the workpiece W. The driving member N is driven deeply into the workpiece W such that the head Na protrudes from the surface of the workpiece W by the protruding length H. The wheel 23 continues to rotate while the driver 15 moves downward and after the driver 15 reaches the bottom dead center. When the driver 15 is disposed at the bottom dead center and the wheel 23 rotates by a predetermined rotation angle, one of the engaging portions 24 engages a bottom portion of the uppermost rack tooth 15*a* of the driver 15. Because of this engagement, the driver 15 starts to move upward. When one of the engaging portion 24 engages the lowermost rack tooth 15*a*, the driver 15 is disposed at (returns to) the standby position. The driver 15 and the piston 14 stops when reaching the standby position, for example, by adequately measuring a time from when the motor 20 is activated. The driver 15 is held at the standby position. As described above, a series of the driving operation is completed.

As described above, the driving tool (electric driving tool) 1 includes the driver 15 configured to drive the driving member N. The driving tool 1 includes the driver guide 4 configured to guide a movement of the driver 15. The driving tool 1 includes the contact arm 3 configured to slidably couples to the driver guide 4. The driving tool 1 includes the adapter 30 that is detachably attachable to the contact arm 3, the adapter 30 having the lower end (32). The adapter 30 protrudes from the contact arm 3 in the driving direction such that when the driving member N is driven by the driver 15 into the workpiece W, the head Na of the driving member N remains protruding outwards from the surface of the workpiece W.

When the adapter 30 attaches to the contact arm 3, a length from the ejection port 2*c* to the surface of the workpiece W becomes longer than that when the adapter 30 does not attach to the adapter 30. Because of this configuration, when the adapter 30 is pushed by the workpiece W, a tip end of the driver guide 4 (the ejection port 2*c*) is apart from the surface of the workpiece W in a direction opposite to the driving direction. In this state, the driving member N ejects from the ejection port 2*c* toward the workpiece W. When the driving member N ejects from the ejection port 2*c*, the driver 15 reaches the bottom dead center. The tip end 15*b* of the driver 15 at the bottom dead center is apart from the surface of the workpiece W in the direction opposite to the driving direction. Accordingly, the driving member N is not driven deeply to an extent that the head Na reaches to the surface of the workpiece W. In other words, the head Na of the driving member N protrudes from the surface of the workpiece W. Further, the head Na protrudes from the surface of the workpiece W regardless of a length, a radius, and a shape of the driving member N. Thus, for example, during disassembling works, the protruding head Na of the driving member N and eventually the driving member N can be easily pulled out from the workpiece W.

As shown in FIG. 6, the lower end 32 of the adapter 30 protrudes from the arm tip end 3*a* of the contact arm 3 by 5 mm to 20 mm. Accordingly, the head Na of the driving member N protrudes from the surface of the workpiece W by a length smaller than or approximately equal to the protruding length T of the adapter 30. Thus, the driving member N can be driven into the workpiece W such that the head Na protrudes from the surface of the workpiece W to be easily pulled out of the workpiece W.

As shown in FIGS. 3, 4, and 12, the adapter 30 includes the lower end 32 which has an arc shape or U shape when viewing in the driving direction. Because of this configuration, the lower end 32 of the adapter 30 has high rigidity with respect to a pushing load applied by the workpiece W. Furthermore, when the driving tool 1 moves to a next driving position, the protruding head Na of the driving member N can escape outwards of the adapter 30 from the arc-shaped or U-shaped opening of the lower end 32. Accordingly, the driving tool 1 has high operability for a user to perform a driving operation.

As shown in FIGS. 4 and 12, an inner circumference of the lower end 32 of the adapter 30 has a side that is opened and three sides when viewed in the driving direction. Because of this configuration, the lower end 32 of the adapter 30 has a shape with high rigidity. Accordingly, the lower end 32 of the adapter 30 has high rigidity with respect to a pushing load applied by the workpiece W.

As shown in FIGS. 3, 8, and 11, the adapter 30 includes the main body 31 having the lower end 32. The main body 31 below the arm tip end 31 of the contact arm 3 in the driving direction has relatively the same sectional shape as the lower end 32 in a direction perpendicular to the driving direction. Because of this configuration, the main body 31 of the adapter 30 has the same rigidity to the lower end 32 below the arm tip end 3*a* of the contact arm 3 in the driving direction. Accordingly, the adapter 30 has high rigidity with respect to a pushing load applied by the workpiece W. Furthermore, the main body 31 of the adapter 30 has the driving passage 2*a* that straightly extends downward from the ejection port 2*c* of the driver guide 4 below the arm tip end 3*a* of the contact arm 3 in the driving direction. Thus, the driver 15 moving in the adjoining area of the bottom dead center can be guided straight in the driving direction.

As shown in FIGS. 3, 8, and 9, the adapter 30 includes the pair of guide pieces 33 extending to the contact arm 3 in a cantilevered manner. The adapter 30 includes the pair of hooks 33*c*, each of which protrudes from each of the pair of guide pieces 33 and is engageable with the contact arm 3. Accordingly, the pair of guide pieces 33 can be easily deflected. Thus, the pair of guide pieces 33 can be deflected for the pair of hooks 33*c* that engages the contact arm 3 to easily detach from the contact arm 3.

As shown in FIGS. 3 and 11, the adapter 30 includes the main body 31 that has the arc shape or U shape which is thicker than the pair of guide pieces 33 in cross section when viewed in a direction perpendicular to the driving direction. Because of this configuration, the pair of guide pieces 33 have a rigidity to such a degree as to be deflectable, and the main body has a high rigidity. Accordingly, the adapter 30 can be easily detached from the contact arm 3 while the rigidity of the adapter 30 with respect to the pushing load applied to adapter 30 is maintained.

As shown in FIGS. 3 and 8, the contact arm 3 includes the pair of rails 3*b*, each of which slidably couples to the driver guide 4. The pair of hooks 33*c* of the adapter 30 engage each end portion 3*c* of the pair of rails 3*b* of the contact arm 3. Accordingly, the adapter 30 is attachable to the contact arm 3 that has a conventional structure. Furthermore, the adapter 30 and the contact arm 3 are integrally movable with respect to the driver guide 4.

As shown in FIG. 5, the driving tool 1 includes the piston 14 that is configured to connect to the driver 15. The driving tool 1 includes the cylinder 12 configured such that the piston 14 is movable within the cylinder 12. The driving tool 1 includes the motor 20 that is configured to move the driver 15 in a direction opposite to the driving direction to increase a gas pressure in the cylinder 12. Accordingly, the adapter 30 is attachable to a so-called gas spring type driving tool 1.

When it is required to protrude a head Na of the driving member N (a fastener head Na of the fastener N) from the surface of the workpiece W, a user can use the adapter 30 that is attachable to the contact arm 30 for this purpose. On the contrary, when it is required to drive the driving member N normally in such a manner that the head Na of the driving member N is flush with the surface of the workpiece W, the user detaches the adapter 30 from the contact arm 30. In this way, the gas spring type driving tool 1 which has a conventional structure can be used to change a driving depth of the driving member N by attachment and detachment of the adapter 30.

As shown in FIG. 4, the driver 15 has a rectangular shape when viewed in the driving direction. The driver 4 has also a rectangular shape which surrounds the driver 15 when viewed in the driving direction. The adapter 30 includes the lower end 32 which has the three sides which follow the shape of the driver guide 4 for the adapter 30 to surround the driver guide 4 when viewed in the driving direction. The driver 15 of the gas spring type driving tool 1 includes the engaging portions such as the rack teeth 15*a* which are movable in a direction opposite to the driving direction by, for example, driving of the motor 20. Accordingly, the driver 15 is formed in a rectangular shape in cross section when viewed in a direction perpendicular to the driving direction. Thus, the lower end 32 of the adapter 30 has three sides which surround the rectangular-shaped driver 15. Because of this configuration, the adapter 30 and the driver 4 cooperate to guide the driver 15 straight in the driving direction.

The driving tool 1 discussed above can be modified in various ways. In the present embodiment, the gas spring type driving tool 1 is exemplified. Instead, the present disclosure may be applied to a mechanical spring type driving tool, in which the driver is driven by use of a force of a mechanical compression spring, which is caused by moving the driver in a direction opposite to the driving direction by a lift mechanism. Instead, the present disclosure may be applied to a flywheel type driving tool, in which the driver is driven by use of an inertial force of the flywheel. Instead, the present disclosure may be applied to an electro-pneumatic type driving tool, in which the driver is driven by use of a compressed air caused by rotation of a crank driven by the motor.

A length, a radius, a shape of the driving member N may be modified without limiting to the above-mentioned driving member. In the present embodiment, the magazine 25 is tilted leftward as it extends rearward. Instead, the magazine may extend, for example, straight rearward. Instead, the magazine 25 may tilt upward as it departs from the driving nose 2.

In the present embodiment, the lower end 32 of the adapter 30 and the area of the adapter 30 below the arm tip end 3*a* of the main body 31 have three sides and one side that is opened when viewed from below. Instead, the lower end 32 of the adapter 30 and the area of the adapter 30 below the arm tip end 3*a* of the main body 31 may entirely or partly have a curved shape such as an arc shape or a U shape when viewed from below.

In the present embodiment, the adapter 30 has the right guide piece 33*a* and the left guide piece 33*b*. Instead, the adapter 30 has either one of the right guide piece 33*a* and the left guide piece 33*b*. Instead, the adapter 30 includes another guide piece in addition to the right guide piece 33*a* and the left guide piece 33*b*. In the present embodiment, it is configured such that the pair of hooks 33*c* engage the pair of rails 3*b* from outside to inside in the right-left direction, and the pair of hooks 33*c* are deflected from inside to outside in the right-left direction to disengage from the pair of rails 3*b* of the contact arm 3. Instead, it may be configured such that the pair of hooks 33*c* engage the pair of rails from inside to outside in the right-left direction, and the pair of hooks 33 are deflected from outside to inside in the right-left direction to disengage from the pair of rails 3*b* of the contact arm 3.

We claim:

1. An electric driving tool comprising:
a driver configured to drive a driving member in a driving direction;
a driver guide configured to guide a movement of the driver;
a contact arm including a rail configured to slidably couple to the driver guide; and
an adapter configured to be detachably attachable to the contact arm, the adapter having a lower end, wherein the adapter includes (i) a guide piece that extends upward to the contact arm in a cantilevered manner and (ii) a hook that inwardly protrudes from the guide piece to the rail and is engageable with an upper end of the rail to attach the adapter to the contact arm,
the adapter attached to the contact arm by an engagement of the hook with the upper end of the rail is configured such that the lower end of the adapter is offset from a lower end of the contact arm by a protrusion length T in the driving direction,
the electric driving tool is configured such that a lower end of the driver is located at a fixed distance D from the lower end of the contact arm when the driver reaches a lowermost end position in the driving direction, and
the protrusion length T is greater than the fixed distance D.

2. The electric driving tool according to claim 1, wherein the lower end of the adapter that attaches to the contact arm is configured to protrude from the lower end of the contact arm by 5 mm to 20 mm in the driving direction.

3. The electric driving tool according to claim 2, wherein the lower end of the adapter is configured to protrude from the lower end of the contact arm by 10 mm to 15 mm in the driving direction.

4. The electric driving tool according to claim 1, wherein the lower end of the adapter has an arc shape or a U shape when being viewed in the driving direction.

5. The electric driving tool according to claim 4, wherein an inner circumference of the lower end of the adapter has a side that is opened and three sides when being viewed in the driving direction.

6. The electric driving tool according to claim 5, wherein,
the driver has a rectangular shape when being viewed in the driving direction,
the driver guide has a rectangular shape to surround the driver when being viewed in the driving direction, and
the lower end of the adapter includes the three sides for following a shape of the driver guide for the adapter to surround the driver guide when being viewed in the driving direction.

7. The electric driving tool according to claim 1, wherein,
the adapter includes a main body having the lower end, and
the main body of the adapter positioned below the lower end of the contact arm in the driving direction has substantially a same sectional shape as the lower end in a direction perpendicular to the driving direction.

8. The electric driving tool according to claim 7, wherein,
the main body of the adapter has an arc shape or a U shape when being viewed in the driving direction, and the main body is thicker than the guide piece in cross section perpendicular to the driving direction.

9. The electric driving tool according to claim 7, wherein the main body of the adapter includes a front wall, a right wall, a left wall, a pair of base portions, and one of the pair of base portions is connected to an upper end of the right wall and the other to an upper end of the left wall.

10. The electric driving tool according to claim 9, wherein the guide piece is configured to extend from each of the base portions in the cantilevered manner.

11. The electric driving tool according to claim 9, wherein the pair of base portions are formed asymmetrically in a right-left direction.

12. The electric driving tool according to claim 9, wherein the guide piece has an elongated hole extending longitudinally from an adjoining area of each of the pair of base portions to an adjoining area of an upper end of the guide piece.

13. The electric driving tool according to claim 9, wherein the front wall includes an engagement portion that is engageable with an upper tip end the contact arm.

14. The electric driving tool according to claim 9, wherein, the front wall includes a rib-shaped first indicator that protrudes frontward and extends in an up-down direction to indicate a position of the driving member in a right-left direction, and each of the right wall and the left wall includes a rib-shaped second indicator that respectively protrudes rightward and leftward and extends in the up-down direction to indicate a position of the driving member in a front-rear direction.

15. The electric driving tool according to claim 1, further comprising:

a piston configured to connect to the driver;

a cylinder configured such that the piston is movable within the cylinder; and a motor that is configured to move the driver in a direction opposite to the driving direction to increase a gas pressure in the cylinder.

16. The electric driving tool according to claim 1, wherein a length between a head of the driving member driven by the driver and a surface of a workpiece is 10 mm to 15 mm.

17. The electric driving tool according to claim 1, wherein the lower end of the driver is positioned between the lower end of the adapter and the lower end of the contact arm when the driving member is driven into a workpiece.

18. The electric driving tool according to claim 1, wherein the driving tool is selected from the group consisting of a gas spring type driving tool, a mechanical spring type driving tool, a flywheel type driving tool, and an electro-pneumatic type driving tool.

* * * * *